(12) United States Patent
Anderson et al.

(10) Patent No.: US 9,093,942 B2
(45) Date of Patent: Jul. 28, 2015

(54) ASSYMETRICAL POWER INVERTER

(71) Applicant: Trane International Inc., Piscataway, NJ (US)

(72) Inventors: Korwin Jay Anderson, Pasadena, CA (US); Thomas Anthony Lipo, Middleton, WI (US)

(73) Assignee: TRANE INTERNATIONAL INC., Piscataway, NJ (US)

( * ) Notice: Subject to any disclaimer, the term of this patent is extended or adjusted under 35 U.S.C. 154(b) by 163 days.

(21) Appl. No.: 13/938,595

(22) Filed: Jul. 10, 2013

(65) Prior Publication Data

US 2014/0015464 A1  Jan. 16, 2014

Related U.S. Application Data

(60) Provisional application No. 61/669,958, filed on Jul. 10, 2012.

(51) Int. Cl.
| | | |
|---|---|---|
| *H02P 1/30* | (2006.01) | |
| *H02P 27/06* | (2006.01) | |
| *H02K 15/00* | (2006.01) | |
| *H02P 1/44* | (2006.01) | |

(52) U.S. Cl.
CPC ............ *H02P 27/06* (2013.01); *H02K 15/0006* (2013.01); *H02P 1/44* (2013.01); *Y10T 29/49009* (2015.01)

(58) Field of Classification Search
CPC .............. H02P 25/04; H02P 1/42; H02P 1/44

USPC ......... 318/503, 502, 751, 753, 785, 756, 755, 318/754, 494

See application file for complete search history.

(56) References Cited

U.S. PATENT DOCUMENTS

| | | | | |
|---|---|---|---|---|
| 4,092,509 | A * | 5/1978 | Mitchell | 219/625 |
| 4,270,163 | A * | 5/1981 | Baker | 363/43 |
| 5,146,147 | A * | 9/1992 | Wills et al. | 318/797 |
| 5,883,490 | A * | 3/1999 | Moreira | 318/807 |

OTHER PUBLICATIONS

Lettenmaier, Terrance A., et al., "Single-Phase Induction Motor with an Electronically Controlled Capacitor", IEEE Transactions on Industry Applications, Vo. 27, No. 1, Jan. and Feb. 1991, pp. 38-43.

* cited by examiner

*Primary Examiner* — Rita Leykin
(74) *Attorney, Agent, or Firm* — Taft Stettinius & Hollister LLP (57) ABSTRACT

An exemplary inverter includes first, second and third legs connected in parallel to a line rail and a neutral rail. Each leg includes a first switch, a second switch, and a node between the first and second switches. The first leg further includes a voltage boosting section operable to selectively increase and decrease the voltage potential of the node of the first leg. The voltage boosting section may include a capacitor in parallel with the first and second switches. The first leg may further include a third switch in series with the voltage boosting section and between the voltage boosting section and the line rail, and a fourth switch in series with the voltage boosting section and between the voltage boosting section and the neutral rail.

26 Claims, 7 Drawing Sheets

ASSYMETRICAL POWER INVERTER

CROSS REFERENCE TO RELATED APPLICATIONS

The present application claims the benefit of U.S. Provisional Patent Application 61/669,958, filed Jul. 10, 2012, which is incorporated herein by reference.

BACKGROUND

Permanent-split capacitor (PSC) motors are widely used in a number of applications including HVAC fan and pump applications less than 5 hp. PSC motors generally operate at efficiencies from 20% to 65%. It is estimated that 100 million PSC motors are currently installed in HVAC applications in the United States, operating at average nominal efficiencies near 50%. These low efficiencies represent a significant cost, whether measured in equivalent pounds of carbon emissions, dollars, or other metrics.

Figure 8:
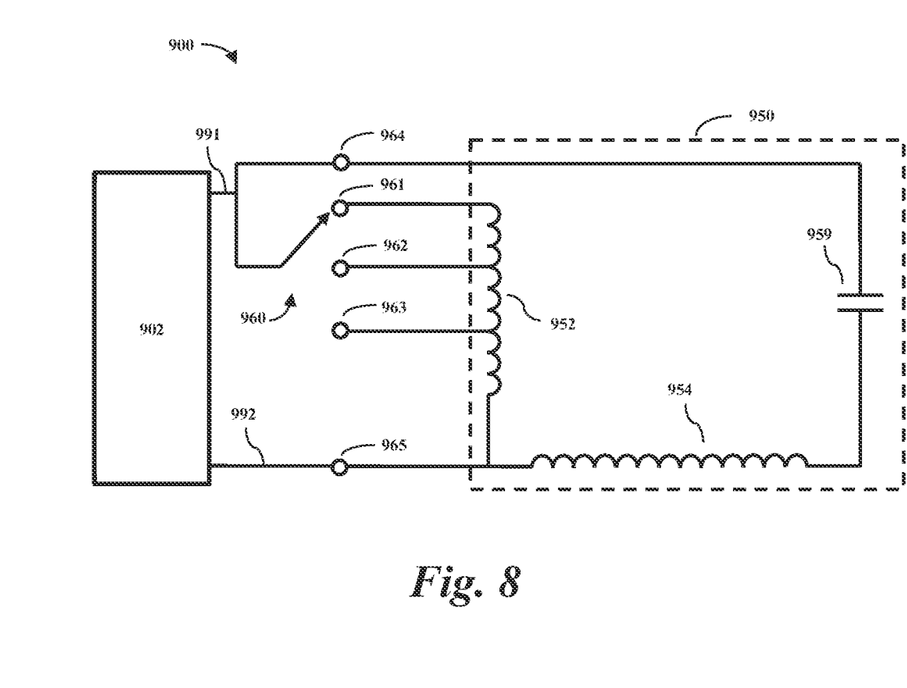
FIG. 8 is a schematic illustration of a conventional PSC motor system.

FIG. 8 illustrates a conventional PSC motor system 900, including a power supply 902, a PSC motor 950, and a tap selector 960. Power supply 902 has a first terminal connected to a line rail 991 and a second terminal connected to a neutral rail 992. Motor 950 has a main winding 952, an auxiliary winding 954, a rotor (not shown), and a capacitor 959. Main winding 952 and auxiliary winding 954 are connected to neutral rail 992 by a common neutral pole 965. Auxiliary winding 954 is connected to line rail 991 by auxiliary pole 964. Main winding 952 has multiple taps 961, 962, 963, each connected to main winding 952 at a different location of the winding. Tap selector 960 connects line rail 991 to main winding 952 via one of the taps. Motor 950 is operable at three discrete speeds, with the motor speed being determined by the tap to which line rail 991 is connected via tap selector 960. The permanently installed capacitor trades off starting torque capability at standstill with ripple torque reduction at running speed. Due to the high volt-ampere (VA) rating of capacitors, the capacitor is often selected to meet the minimum starting performance requirements, resulting in poor running efficiency.

The main winding in a PSC motor is traditionally designed to meet a specified breakdown torque performance. The auxiliary winding is designed for a specific range of values of capacitors to limit inrush current that meet single-phase utility connection requirements, to provide adequate starting performance, and to meet the physical constraint of fitting the conductors in the slot area. The balancing of these tradeoffs does not lead to the best machine efficiency, particularly at small power ratings. Consequently, small size wire and inexpensive materials are used, resulting in significant winding resistances and core losses. These drawbacks have led many to abandon PSC motors in favor of three-phase motors driven by a three phase inverter. However, retrofitting an existing system in this manner requires the replacement of the motor and the introduction of a power electronic system to realize the upgrade. Historically, it has been prohibitively costly to install a full scale three phase variable speed drive with a motor in HVAC applications.

Main winding 952 and auxiliary winding 954 require different currents for proper operation of the motor. While the voltage applied to the main winding need not be more than the utility supply voltage, the voltage applied to the auxiliary winding needs to be sufficient to balance the machine's magneto-motive force (MMF). These constraints require a DC bus voltage at least greater than about 1.5 times the peak value of the rated voltage of the motor when a conventional inverter is used to retrofit a PSC motor. Such high voltages can pose a risk of partial discharge events resulting in damage to the windings. In other words, conventional inverters can realize the full voltage requirement for auxiliary winding 954 only at the cost of increased voltage stress on main winding 952. There is thus a need for the unique and inventive systems and methods disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall be understood that no limitation of the scope of the invention is thereby created, and that the invention includes and protects such alterations, modifications, and further applications of the exemplary embodiments as would occur to one skilled in the art to which the invention relates.

SUMMARY

In one embodiment, an inverter includes first, second and third legs connected in parallel to a line rail and a neutral rail. Each leg includes a first switch, a second switch, and a node between the first and second switches. One of the legs further includes a voltage boosting section operable to selectively increase and decrease the voltage potential of the node of the first leg. The voltage boosting section may include a capacitor in parallel with the first and second switches. The first leg may further include a third switch in series with the voltage boosting section and between the voltage boosting section and the line rail, and a fourth switch in series with the voltage boosting section and between the voltage boosting section and the neutral rail.

DETAILED DESCRIPTION OF ILLUSTRATIVE EMBODIMENTS

Figure 1:
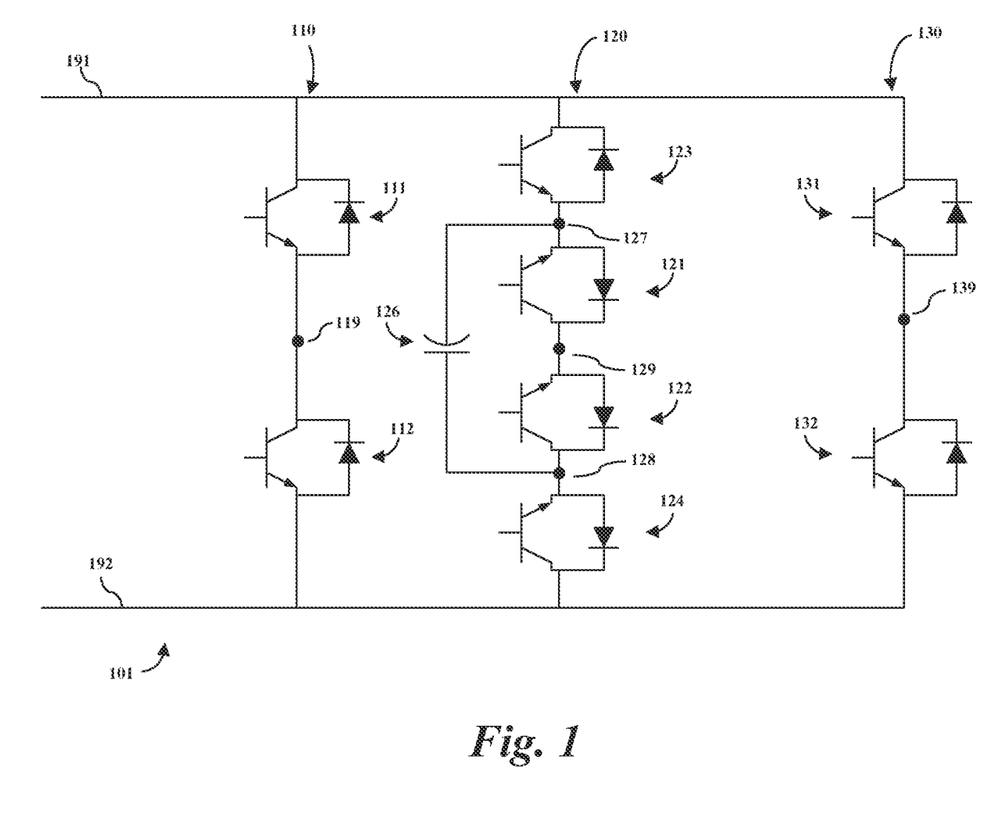
FIG. 1 is an illustrative schematic of a power inverter according to one embodiment of the present invention.

FIG. 1 illustrates an example inverter 101 according to one embodiment of the present invention. Inverter 100 comprises three legs 110, 120, 130 connected in parallel to a line rail 191 having a first voltage potential and a neutral rail 192 having a second voltage potential less than the first voltage potential.

The voltage difference between rails 191, 192 is termed the DC bus voltage. Each leg 110, 120, 130 includes a first switching element 111, 121, 131, a second switching element 112, 122, 123, and a node 119, 129, 139 between the switching elements. As used herein, "between" is in reference to the electrical connections of the elements without regard to the physical location of the elements, unless specifically stated otherwise. That is to say, node 119 is between switches 111 and 112 in that it is located on a wire which connects the switches.

Leg 120 also includes a boost capacitor 126, a third switch 123, and a fourth switch 124. Switches 121-124 are in series, with a node 127 between switch 123 and switch 121, and another node 128 between switch 122 and switch 124. Boost capacitor 126 is coupled to nodes 127, 128, and is thus in parallel with switches 121, 122, and in series with switches 123, 124.

Each of the switches in inverter 101 is operable between an ON state in which the switch conducts electricity and an OFF state in which the switch does not conduct electricity. As will be readily recognized by one having skill in the art, a switch may continue to conduct a small amount of current in the OFF state, due to leakage. In the illustrated embodiment, each of the switches includes an insulated gate bipolar transistor and a flyback diode. In other embodiments, one or more of the switches may be of a different configuration. By way of non-limiting example, switches 121 and 122 may be power MOSFETs. It is also contemplated that other switching elements may be used.

Boost capacitor 126 and switches 121, 122 define a boosting section of leg 120. Boost capacitor 126 is configured to selectively accumulate and discharge electrical energy based on the state of switches 121-124. For example, when switches 121 and 124 are ON and switches 122 and 123 are OFF, boost capacitor 126 charges, and the voltage seen at node 129 decreases. By contrast, when switches 121 and 124 are OFF and switches 122 and 123 are ON, boost capacitor 126 discharges, increasing the voltage seen at node 129. By controlling the operation of switches 121-124 (for example as described below), the voltage seen at node 129 can be made less than the DC bus voltage (bucking), or greater than the DC bus voltage (boosting). Leg 120 may therefore be referred to as a buck-boost leg.

Figure 2:
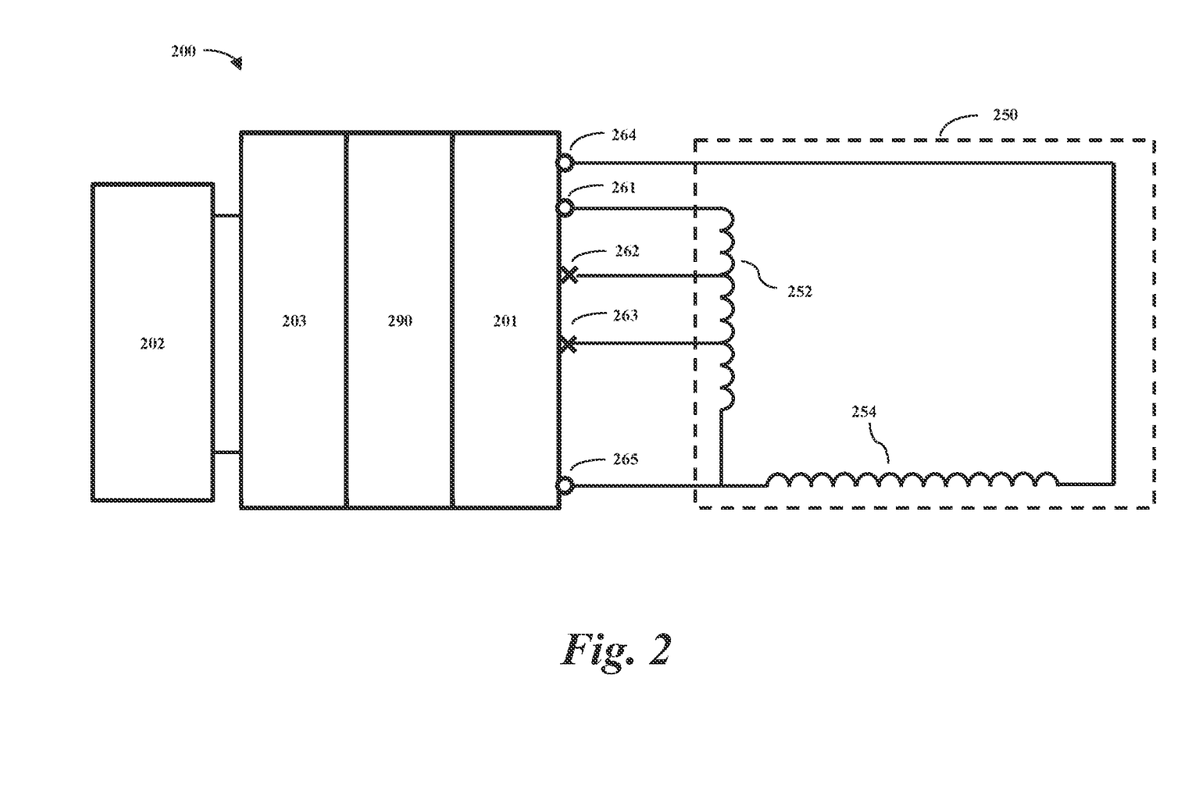
FIG. 2 is an illustrative schematic of a retrofitted PSC motor system according to one embodiment of the present invention.

FIG. 2 illustrates an example retrofit 200 for conventional PSC motor system 900, in which similar reference characters denote similar elements. The retrofit utilizes the existing motor 950, and replaces capacitor 959 with a power inverter optimized for the motor topology. Retrofitted system 200 includes a power supply 202, a rectifier 203, a DC bus 290, an inverter 201, and a motor 250. In the illustrated embodiment, power supply 202 is a single phase AC power supply. In other embodiments, power supply 202 may be of a different configuration, such as a multi-phase AC power supply.

Rectifier 203 is configured to convert AC voltage from power supply 202 to DC voltage, which is supplied to DC bus 290. Rectifier 203 may be a line doubling rectifier, an active rectifier, a bridge rectifier, or any other rectifier known in the art. Inverter 201 converts DC voltage received from DC bus 290 to three-phase AC voltage, which is provided to motor 250.

Motor 250 includes a main winding 252, an auxiliary winding 254, and a rotor (not shown). As part of the retrofitting of system 900, capacitor 959 has been removed. Main winding 252 and auxiliary winding 254 are connected to a first output node of inverter 201 at a common neutral pole 265. Auxiliary winding 254 is connected to a second output node of inverter 201 at auxiliary pole 264. Main winding 252 is connected to a third output node of inverter 201 at main pole 261. Taps 262, 263 are floating connections which are not connected to an output node of inverter 201.

Inverter 201 may be configured similar to inverter 101, or may be of another configuration, so long as inverter 201 is capable of selectively increasing and decreasing the voltage potential of one of the output nodes. The output nodes may be connected to poles 261, 264, 265 as described below with reference to FIG. 3, or may be connected in another manner.

Figure 3:
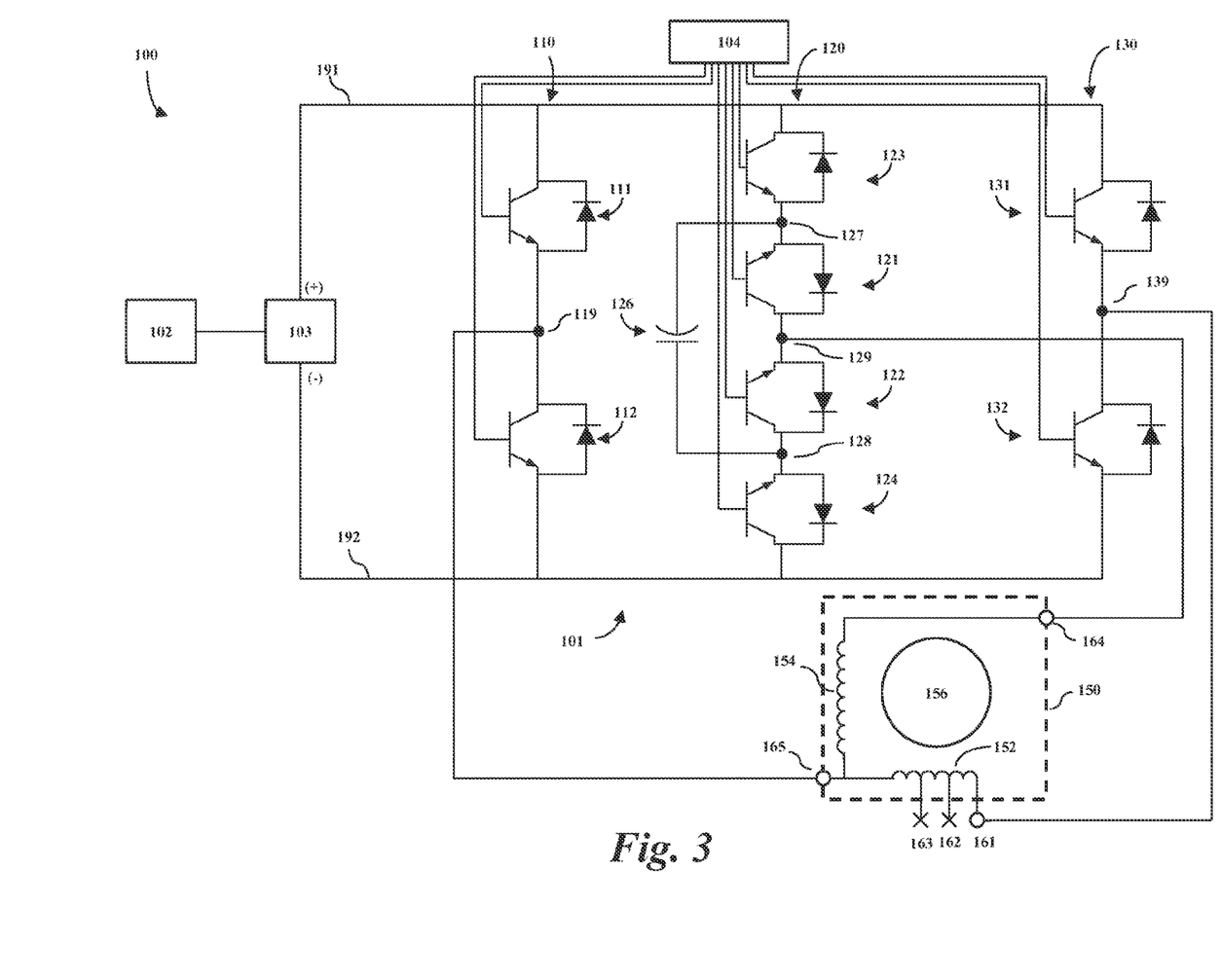
FIG. 3 is a schematic of a PSC motor system which has been retrofitted with the inverter of FIG. 1.

FIG. 3 illustrates an example system 100 including inverter 101, a power source 102, a rectifier 103, a controller 104, and a motor 150. Power source 102 is an AC power source, and is connected to rectifier 103. Rectifier 103 converts the AC power from power source 102 to DC power. Rectifier 103 has a positive terminal (+) connected to a line rail 191 and a negative terminal (−) connected to a neutral rail 192. It is also contemplated that power source 102 may be a DC power source, such as a battery or ultra-capacitor, in which case rectifier 103 may be omitted.

Motor 150 is a retrofitted PSC motor from which the capacitor has been removed. Motor 150 includes a main winding 152, an auxiliary winding 154, and a rotor 156. As is known in the art, when electrical current flows through windings 152, 154, a magnetic field is generated, which causes rotation of rotor 156. Rotation of rotor 156 may be used to power a fan, pump, or other apparatus. Main winding 152 has one terminal connected to main pole 161, and a second terminal connected to neutral pole 165. Auxiliary winding 154 has one terminal connected to auxiliary pole 164, and a second terminal connected to neutral pole 165. Main pole 161 is connected to node 139, auxiliary pole 164 is connected to node 129, and neutral pole 165 is connected to node 119.

In the illustrated embodiment, taps 162, 163 are floating connections, and the tap selector has been removed. In other embodiments, the tap selector may remain in the system. In such embodiments, the tap selector may be permanently coupled to the remaining tap, or may simply be disconnected from the controller.

Controller 104 is configured to operate the switches such that the DC voltage from rectifier 103 is converted to an AC voltage waveform at each of nodes 119, 129, 139. The AC waveform at each node 119, 129, 139 may comprise a portion of a three-phase AC waveform, for example with each phase offset from the other phases by 120°. Controller 104 may control certain pairs of switches in a complementary mode—that is to say, when the first switch of the pair is ON, the second switch is OFF, and vice-versa. In the illustrated embodiment, switches 121 and 122 are operated in complementary mode, and switches 123 and 124 are operated in complementary mode. Controller 104 may operate switches 111 and 112 in complementary mode. Controller 104 may also operate switches 131 and 132 in complementary mode. In other embodiments, one or more of the switches may be operated independently.

As previously described, capacitor 126 is configured to accumulate and discharge electrical energy based on the state of switches 121-124. Table 1 shows the four states of switches 121-124 for the illustrated embodiment (in which switches 121 and 122 are operated in complementary mode, and switches 123 and 124 are operated in complementary mode), the voltage at node 129 ($v_{129}$), and the current flowing into or out of boost capacitor 126 ($i_c$). Variable $v_c$ is the voltage potential of boost capacitor 126, variable $v_{bus}$ is the DC bus voltage, and variable $i_{129}$ is the current through node 129.

TABLE 1

| 121 | 122 | 123 | 124 | $v_{129}$ | $i_c$ | Comments |
|-----|-----|-----|-----|-----------|-------|----------|
| OFF | ON  | OFF | ON  | 0 | 0 | bypasses capacitor |
| OFF | ON  | ON  | OFF | $v_{bus} + v_c$ | $-i_{129}$ | discharges capacitor |
| ON  | OFF | OFF | ON  | $-v_c$ | $i_{129}$ | charges capacitor |
| ON  | OFF | ON  | OFF | $v_{bus}$ | 0 | bypasses capacitor |

Figure 4:
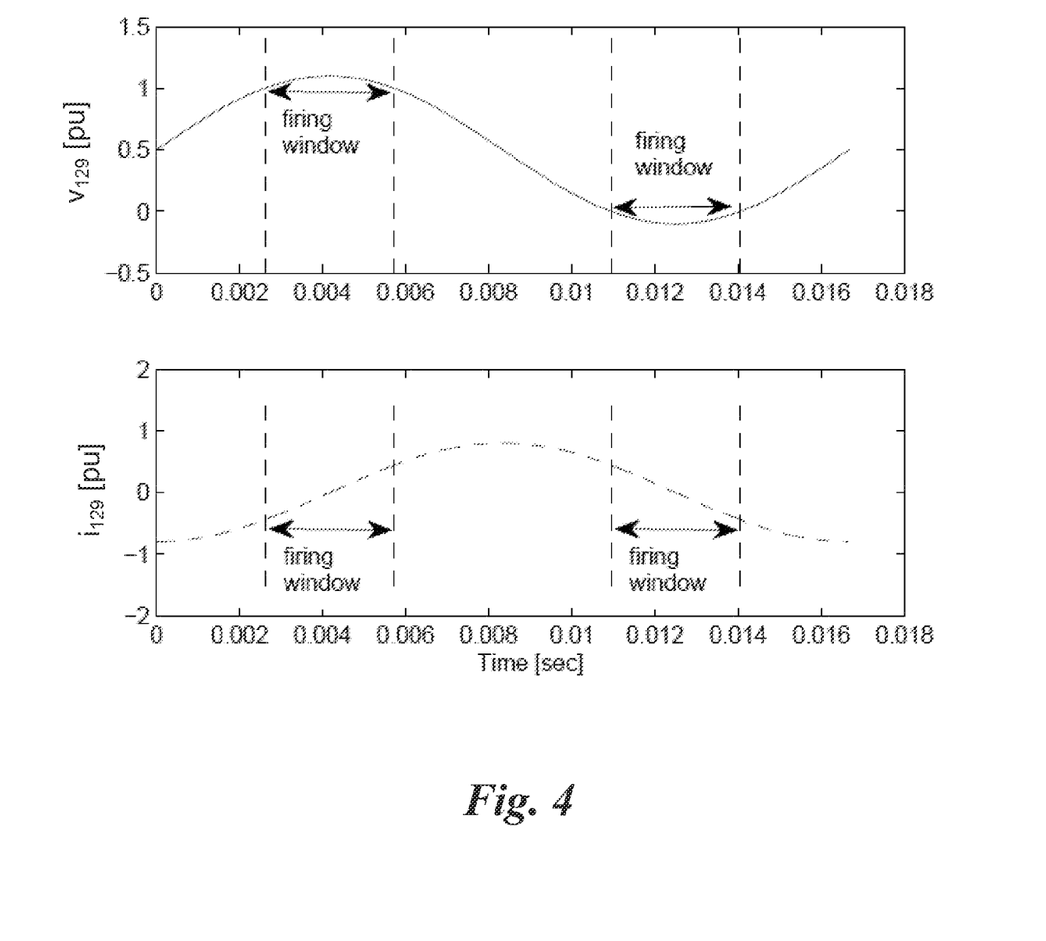
FIG. 4 is a graph illustrating an exemplary firing window in which a boost capacitor is discharged.

As shown in the table, when switches 121 and 124 are ON and switches 122 and 123 are OFF, boost capacitor 126 charges. By contrast, when switches 121 and 124 are OFF and switches 122 and 123 are ON, boost capacitor 126 discharges. Thus, the current passing through node 129 (to auxiliary winding 154) can be of a different rating than the current passing through node 139 (to main winding 152). Complementary switches 123 and 124 are controlled by controller 104 according to a predetermined pattern referred to as the buck switching function. Complementary switches 121 and 122 are controlled by controller 104 according to a predetermined pattern referred to as the boost switching function. The frequency and duty cycle of the boost switching function may be selected such that boost capacitor 126 discharges (thereby boosting the voltage provided to node 129) within a firing window corresponding to the peak or trough of the AC voltage waveform seen at node 129, as illustrated in FIG. 4.

The firing window is defined to be the percentage of the fundamental cycle that the boost function depletes charge from boost capacitor 126. If the firing window is too small, an insufficient boost will be provided to node 129. By contrast, if the firing window is too great, capacitor 126 will not have sufficient time to recharge between boost events. In order to correctly control boost voltage within the constraints of the conducted machine currents, the proper duty cycles for the buck and boost switching functions must be determined. The voltage potential at node 129 is defined by Equation 1, and the capacitor current is defined by Equation 2. The definition of each of the variables is shown in Table 2.

TABLE 2

| | |
|---|---|
| $d_{boost}$ | Duty cycle of boost switching function |
| $d_{buck}$ | Duty cycle of buck switching function |
| $i_{129}$ | Current through node 129 |
| $i_c$ | Current into or out of capacitor 126 |
| $v_{129}$ | Voltage potential at node 129 |
| $v_{bus}$ | DC bus voltage |
| $v_c$ | Voltage potential of capacitor 126 |

$$v_{129} = v_{bus} \cdot d_{buck} - v_c(1 - d_{buck} - d_{boost}) \quad \text{Equation 1}$$

$$i_c = i_{129}(1 - d_{buck} - d_{boost}) \quad \text{Equation 2}$$

These values can then be used to solve for $d_{buck}$ and $d_{boost}$ as shown in Equations 3 and 4.

$$d_{buck} = \frac{v_{129}}{v_{bus}} + \frac{i_c}{i_{129}} \cdot \frac{v_c}{v_{bus}} \quad \text{Equation 3}$$

$$d_{boost} = 1 - \frac{i_c}{i_{129}} - \frac{v_{129}}{v_{bus}} - \frac{i_c}{i_{129}} \cdot \frac{v_c}{v_{bus}} \quad \text{Equation 4}$$

$$= 1 - d_{buck} - \frac{i_c}{i_{129}}$$

Since the duty cycle ratio is limited to $0 \leq d \leq 1$, there are limits to the instantaneous and averaged numerical values that $d_{buck}$ and $d_{boost}$ can take. That is to say, the duty cycles are constrained to $0 \leq d_{buck} \leq 1$ and $0 \leq d_{boost} \leq 1$. Rewriting the constraint equations using variable $i_c^*$ (the manipulated input to the capacitor voltage controller) and solving for $$\frac{i_c^*}{i_{129}}$$

yields Equations 5 and 6.

$$-\frac{\frac{v_{129}}{v_{bus}}}{\frac{v_c}{v_{bus}}} \leq \frac{i_c^*}{i_{129}} \leq \frac{1 - \frac{v_{129}}{v_{bus}}}{\frac{v_c}{v_{bus}}} \quad \text{Equation 5}$$

$$\frac{\frac{v_{129}}{v_{bus}}}{1 + \frac{v_c}{v_{bus}}} \leq \frac{i_c^*}{i_{129}} \leq \frac{-1 + \frac{v_{129}}{v_{bus}}}{1 + \frac{v_c}{v_{bus}}} \quad \text{Equation 6}$$

Rewriting Equations 5 and 6 into a single equation using variable $v_{129}^*$ (voltage commanded to node 129) yields Equation 7.

$$\max\left(-\frac{v_{129}^*}{v_c}, \frac{v_{129}^*}{v_{bus} + v_c}\right) < \frac{i_c^*}{i_{129}} < \min\left(\frac{1 - \frac{v_{129}^*}{v_{bus}}}{\frac{v_c}{v_{bus}}}, \frac{-1 + \frac{v_{129}^*}{v_{bus}}}{1 + \frac{v_c}{v_{bus}}}\right) \quad \text{Equation 7}$$

In order to correctly constrain the duty cycle ratios, the minimums and maximums given in Equation 7 are applied to the quantities identified in Equations 3 and 4. If this is done, the duty cycle commands will correctly generate the commanded pole voltage and boost capacitor current.

When in boost mode, the commanded current command may be set to zero, since the limits will always result in a current command that is negative. A limit can be imposed on the current command if capacitor voltage cannot otherwise be maintained.

When in buck mode, the commanded current is generated from a boost capacitor voltage regulator (described below). The required limits are imposed on this current command and faithfully result in the commanded voltage and current.

The constraints imposed by Equations 3, 4, and 7 may be implemented in a number of exemplary control strategies, which may utilize, for example, a PID controller, a PI controller, or a P controller, among others. In one exemplary implementation $v_{129}^*$ is used to control motor current and $i_c^*$ is utilized to regulate capacitor voltage. In the present example, the commanded current $i_c^*$ is rationalized against the charge balance in the firing window. In other words, over one fundamental output cycle, the time average of $i_c^*$ is zero.

Figure 5:
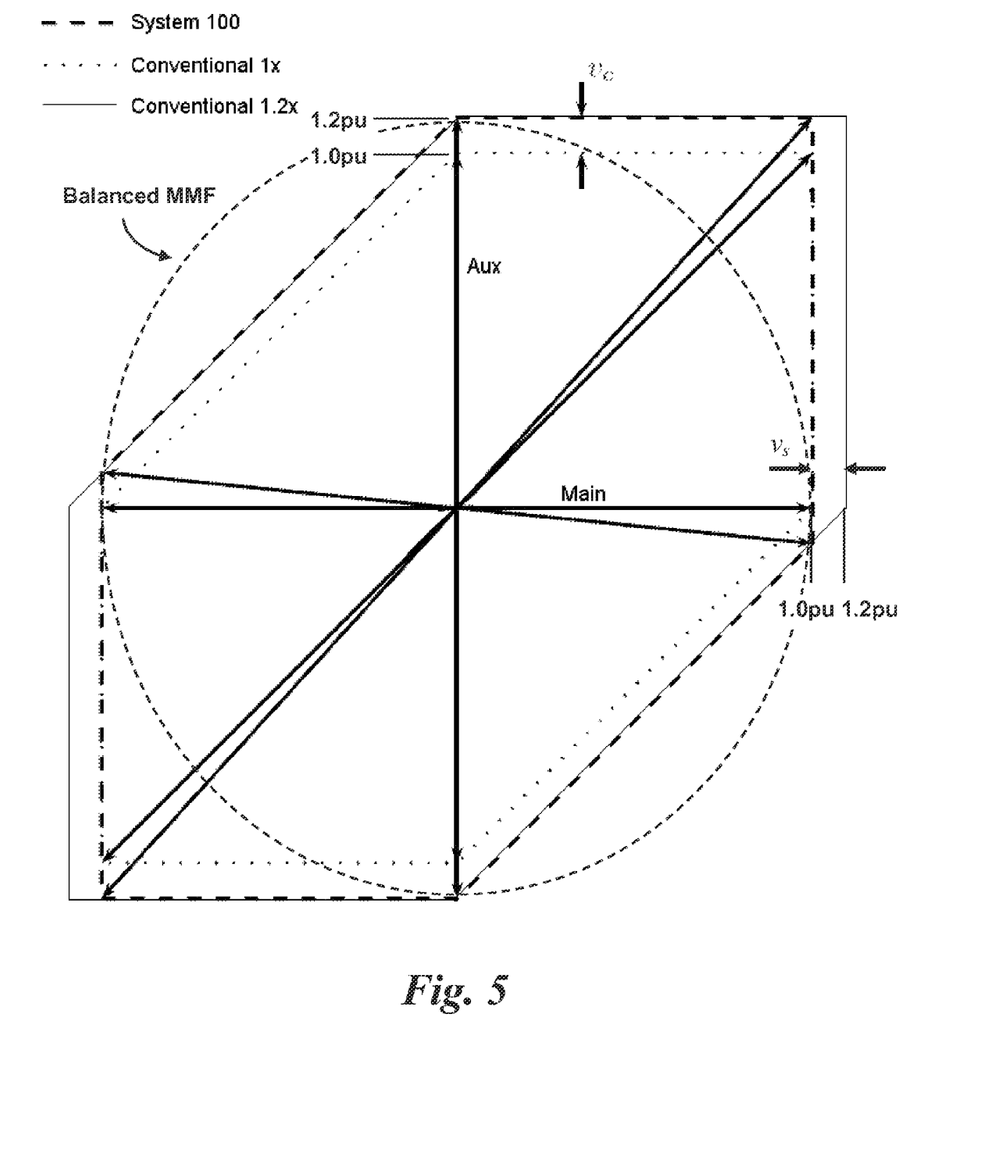
FIG. 5 is a graph comparing voltage vectors of conventional retrofitted PSC motors to those of the system of FIG. 3.

FIG. 5 illustrates voltage vectors (in dimensionless per-unit quantities) characteristic of systems using conventional inverters as compared to those of system 100. The horizontal axis denotes the voltage across the main winding, and the vertical axis denotes the voltage across the auxiliary winding. The dotted ellipse represents the voltage which must be provided to the respective windings in order to balance the MMF of the engine. In the illustrated embodiment, the voltage which must be provided to the auxiliary winding is about 1.2 times the voltage provided to the main winding. While the precise ratio may vary from motor to motor, one winding will generally require a greater voltage than the other winding if a balanced MMF is to be obtained.

As previously stated, conventional inverters cannot realize the full voltage requirement for an auxiliary winding without increasing voltage stress on the main winding. The dotted hexagon represents one such system, in which no additional voltage stress is applied to the main winding, but the auxiliary winding does not receive sufficient voltage. By contrast, the solid hexagon represents a system in which the auxiliary winding receives sufficient voltage, but the main winding experiences an additional voltage stress $v_s$. The dashed hexagon represents system 100, in which an appropriate capacitance of boost capacitor 126 and duty cycle for the buck and boost switching functions have been selected, resulting in a voltage boost $v_c$ for auxiliary winding 154 without additional voltage stress to main winding 152. In the illustrated embodiment, the voltage boost $v_c$ is about 20%, although other voltage boosts—for example, of about 40% —may be obtained by proper selection of boost capacitor 126 and duty cycles $d_{buck}$ and $d_{boost}$.

Figure 6:
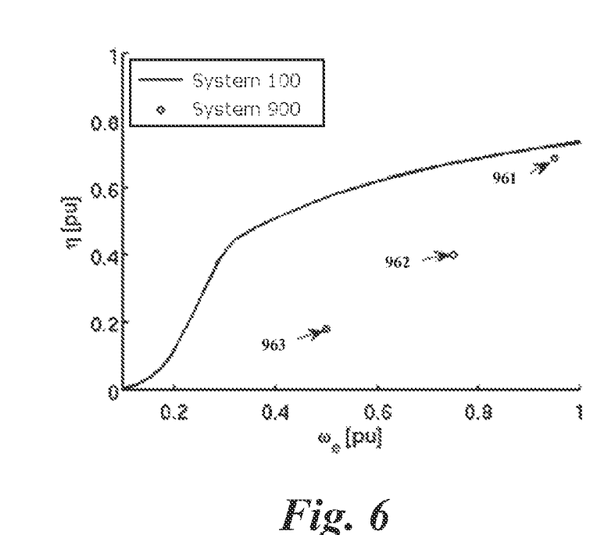
FIG. 6 is a graph of efficiency versus motor speed for the system of FIG. 3 and a conventional PSC motor system.

Due in part to the proper current ratios through windings 252 and 254, system 100 operates at a significantly improved efficiency as compared to conventional system 900. FIG. 6 illustrates an example graph of efficiency η versus motor speed ω (both normalized to a dimensionless per-unit value). As can be seen from the graph, system 100 represents a significant efficiency improvement over system 900 at all motor speeds.

Figure 7:
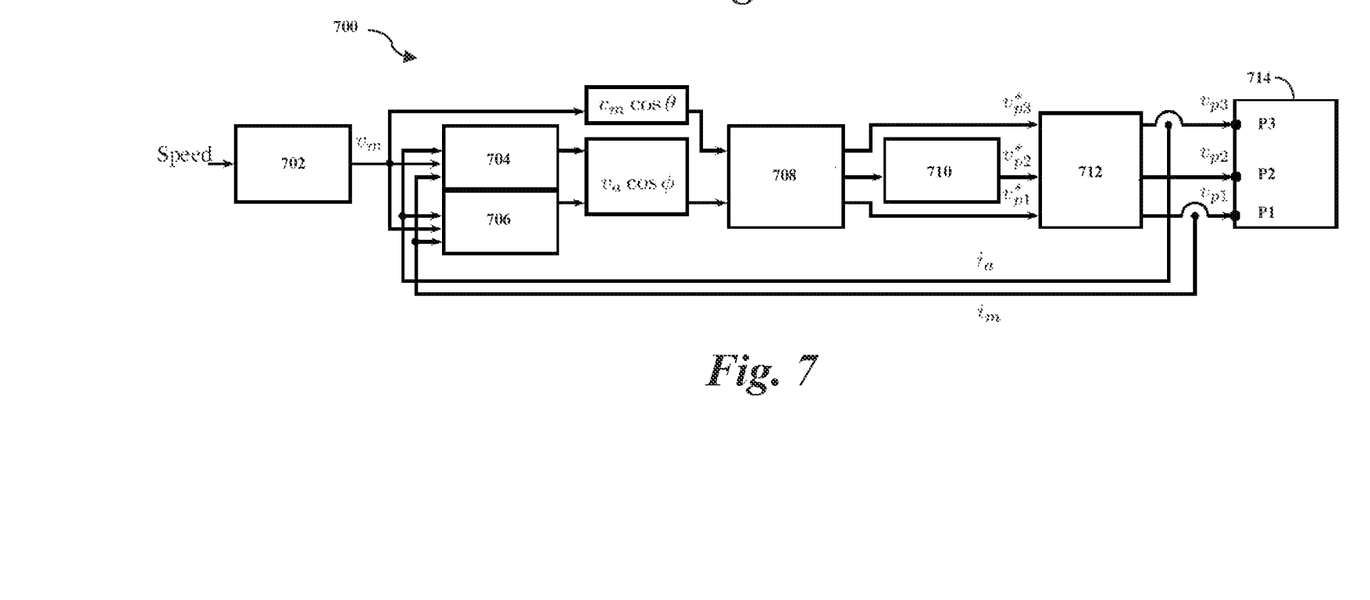
FIG. 7 is block diagram of an example control system used with the system of FIG. 3.

FIG. 7 illustrates a block diagram of an example controller 700 for system 100. Controller 700 is a steady-state controller that is able to maintain currents in quadrature with a bandwidth of about 1 Hz, which is sufficient for present application of PSC motors in HVAC applications.

A voltage command generator 702 uses the flux trajectory and optionally compensates for utility voltage sags. A phase regulator 704 and magnitude regulator 706 normalize the main winding current signal $i_m$ and the auxiliary winding current signal $i_a$, and compute the phase error and the current magnitude. A proportional-integral (PI) controller is then formed to control the magnitude and phase of the current signal. Winding voltage commands are then generated by an incrementing angle.

Modulator 708 uses the winding voltage commands and a modulation strategy to generate the three pole voltage commands. The limits to winding-voltage commands and to pole-voltage commands are listed in Table 3 (normalized to dimensionless per-unit quantities). The boost voltage is allowed to exceed the duty cycle limits by 0.5.

TABLE 3

| Quantity | Lower Limit | Upper Limit |
|---|---|---|
| $v_m^*$ | −1 | 1 |
| $v_a^*$ | $-\dfrac{N_a}{N_m}$ | $\dfrac{N_a}{N_m}$ |
| $v_{p1}^*$ | 0 | 1 |
| $v_{p2}^*$ | −0.5 | 1.5 |
| $v_{p3}^*$ | 0 | 1 |

Boost controller 710 accepts a boost voltage command from −0.5 to 1.5 and manages the boost capacitor to achieve the commanded voltage. This is done to deliver the voltage below 0 and above 1 that the modulator commands. As a result, the voltage capability of inverter 712 for the auxiliary winding is extended.

Inverter 712 includes switches and sensors, and is connected to a DC power source (not shown). Inverter 712 receives voltage commands $v_{p1}^*, v_{p2}^*, v_{p3}^*$ from modulator 708 and boost controller 710. The switches in inverter 712 switch on and off in response to the voltage commands. Voltage commands $v_{p1}^*, v_{p2}^*, v_{p3}^*$ are such that the operation of the switches converts the DC voltage to a three-phase AC voltage comprising voltages $v_{p1}, v_{p2}, v_{p3}$. The voltage across the boost capacitor is fed back to boost controller 710, and the DC link voltage is fed back to voltage command generator 702.

Motor 714 is a PSC motor having three poles P1, P2, P3 and main and auxiliary windings (not shown). Motor 714 receives the three-phase AC voltage from inverter 712. Main pole P1 receives voltage $v_{p1}$, auxiliary pole P2 receives voltage $v_{p2}$, and neutral pole P3 receives voltage $v_{p3}$. The main winding has one terminal connected to main pole P1 and the other terminal connected to neutral pole P3. The auxiliary winding has one terminal connected to auxiliary pole P2 and the other terminal connected to neutral pole P3. The machine currents $i_a$, $i_m$ are fed back to the phase regulator 704 and magnitude regulator 706.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    a variable frequency drive including a rectifier, a DC bus, and an inverter, the inverter including a plurality of inverter legs; and
    an electric motor operatively connected with the inverter, the motor including a main winding and an auxiliary winding, the main winding connected with a first leg of the inverter at a first main winding node and connected with a second leg of the inverter at a second main winding node, the auxiliary winding connected with a third leg of the inverter at a first auxiliary winding node and connected with the second leg of the inverter at a second auxiliary winding node;
    wherein the third leg of the inverter includes a plurality of switching devices and a capacitor selectably electrically connectable with the first auxiliary winding node by switching one or more of the switching devices;
    wherein the third leg of the inverter comprises a first switching device, a second switching device, a third switching device, and a fourth switching device connected in series between a first rail of the DC bus and a second rail of the DC bus; the capacitor is connected to a first inverter node between the first switching device and the second switching device and connected to a second inverter node between the third switching device and the fourth switching device; and the first auxiliary winding node is connected with the third leg of the inverter at a node intermediate the second switching device and the third switching device.

2. A system according to claim 1 further comprising a controller operatively connected with and configured to control the inverter.

3. A system according to claim 2 wherein the controller is configured to connect the capacitor to the first auxiliary winding node through a first of the switching devices to boost the voltage seen at the first auxiliary winding node in a first control state.

4. A system according to claim 3 wherein the first control state corresponds to a peak or a trough of a synthesized voltage waveform seen at the first auxiliary winding node.

5. A system according to claim 3 wherein the controller is configured to connect the capacitor to the first auxiliary winding through a second of the switching devices in a second control state.

6. A system according to claim 5 wherein the second control state corresponds to a portion of the synthesized voltage waveform seen at the first auxiliary winding node intermediate a peak and a trough of a synthesized voltage waveform.

7. A system according to claim 5 wherein the controller is configured to connect the first auxiliary winding node to one of the rails of the DC bus and to bypass the capacitor in a third control state.

8. A system according to claim 5 wherein current flows through the auxiliary winding to charge the capacitor in the second control state.

9. A system comprising:
a variable frequency drive including an inverter and a DC bus, the inverter comprising a plurality of legs electrically connected with a first rail of the DC bus and a second rail of the DC bus, each of the plurality of legs including a plurality of switches and an output node;
wherein a first of the plurality of legs includes a voltage boosting section configured to selectively increase and decrease the voltage at the output node of the first leg based upon actuation of at least one of the switches of the first leg.

10. The system of claim 9, wherein the voltage boosting section includes a capacitor configured in a parallel relationship with a first switch and a second switch of the first leg, and wherein the capacitor is operable to store electrical energy, and to provide a voltage boost to the first leg output node.

11. The system of claim 10 wherein the first leg further comprises a third switch configured in a series relationship with the voltage boosting section and the first rail of the DC bus, and a fourth switch configured in a series relationship with the voltage boosting section and the second rail of the DC bus.

12. The system of claim 11, wherein each of the switches is operable between an ON state and an OFF state, the system further comprising a controller configured to operate the switches of the first leg in a plurality of states including:
a capacitor-charging state in which the first and fourth switches are OFF and the second and third switches are ON;
a capacitor-discharging state in which the first and fourth switches are ON and the second and third switches are OFF;
a first bypass state in which the first and third switches are OFF and the second and fourth switches are ON; and
a second bypass state in which the first and third switches are ON and the second and fourth switches are OFF.

13. The system of claim 12, further comprising a DC voltage source having a positive terminal connected to the first rail of the DC bus and a negative terminal connected to the second rail of the DC bus;
wherein the controller is further configured to operate the switches such that a voltage potential at each node is an alternating current voltage.

14. The system of claim 13, wherein the DC voltage source comprises a rectifier connected to an AC voltage source.

15. The system of claim 13, wherein the voltage potential of the first leg node depends at least in part upon the first leg state, and corresponds to the negative of the capacitor voltage in the capacitor-charging state, the DC bus voltage plus the capacitor voltage in the capacitor-discharging state, zero in the first bypass state, and the DC bus voltage in the second bypass state.

16. The system of claim 15, further comprising a motor including a first winding having a first terminal connected to the output node of the first leg and a second terminal connected to the output node of a second one of the plurality of legs, and a second winding having a first terminal connected to the output node of a third one of the plurality of legs and a second terminal connected to the output node of the second one of the plurality of output legs.

17. The system of claim 16, wherein each of the switches includes at least one of a power MOSFET and an insulated gate bipolar transistor.

18. A method comprising:
modifying a motor system, the system comprising a motor including a main winding and an auxiliary winding, the main winding connected to a neutral pole and selectably connected to a line pole via a plurality of taps along the main winding, the auxiliary winding connected to the neutral pole and to an auxiliary pole, the system further comprising a capacitor connected with the auxiliary pole and connected to the line pole;
wherein the modifying includes removing the capacitor from the system and adding an inverter to the system, the inverter including a plurality of outputs, a first output of the inverter being connected with one of the plurality of taps, a second output of the inverter being connected with the neutral pole, and a third output of the inverter being connected with the auxiliary pole;
wherein the third output of the inverter is an output of an inverter leg including a boost section including a plurality of switches and a boost capacitor, the boost capacitor being connected to the auxiliary pole and selectably charge and discharge by actuation of one or more of the switches.

19. The method of claim 18, wherein the plurality of taps not connected to the first inverter output are connected to floating connections of the inverter.

20. The method of claim 18 wherein the inverter is provided as a component of a variable frequency drive system further including a rectifier and a DC bus.

21. The method of claim 20 further comprising connecting the rectifier to a utility power supply.

22. The method of claim 20, further comprising:
connecting the rectifier to an alternating current (AC) voltage source;
operating the rectifier to convert an AC voltage from the AC voltage source to a direct current (DC) voltage;
supplying the DC voltage to the inverter; and
operating the inverter to selectively provide an AC voltage to each of the nodes.

23. The method of claim 22 wherein said leg including a boost capacitor includes a first switch and a second switch connected with the output node of said leg, a third switch connected with the first switch and a first rail of the DC bus, and a fourth switch coupled with the second switch and a second rail of the DC bus.

24. The method of claim 23 wherein the operating the inverter includes:
   decreasing the voltage potential of the third output and charging the capacitor by setting the first and fourth switches to an ON state in which the switches conduct electricity and setting the second and third switches to an OFF state in which the switches do not conduct electricity; and
   increasing the voltage potential of the third output and discharging the capacitor by setting the first and fourth switches to the OFF state and setting the second and third switches to the ON state.

25. The method of claim 24, the operating the inverter further including:
   adjusting the voltage potential of the third output to correspond to the DC voltage by setting the first and third switches to the ON state and setting the second and fourth switches to the OFF state; and
   adjusting the voltage potential of the third output to zero by setting the first and third switches to the OFF state and setting the second and fourth switches to the ON state.

26. The method of claim 18 wherein the motor system comprises a permanent split capacitor motor system.

\* \* \* \* \*